(12) United States Patent
Kong et al.

(10) Patent No.: US 10,632,920 B2
(45) Date of Patent: Apr. 28, 2020

(54) REARVIEW MIRROR HAVING TILTING STRUCTURE

(71) Applicants: Hyundai Motor Company, Seoul (KR); Kia Motors Corporation, Seoul (KR)

(72) Inventors: Nak Kyoung Kong, Seongnam-si (KR); Jong Min Park, Seoul (KR); Ki Hong Lee, Seoul (KR); Keun Sig Lim, Hwaseong-si (KR); Chang Ju Kim, Daegu (KR); Yong Hwan Kim, Gyeongsan-si (KR); Su Young Choi, Gyeongsan-si (KR); Won Bin Kim, Gyeongsan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 164 days.

(21) Appl. No.: 15/814,054

(22) Filed: Nov. 15, 2017

(65) Prior Publication Data

US 2018/0370437 A1  Dec. 27, 2018

(30) Foreign Application Priority Data

Jun. 26, 2017 (KR) ........................ 10-2017-0080798

(51) Int. Cl.
*B60R 1/04* (2006.01)
*B60R 1/12* (2006.01)
*G07B 15/00* (2011.01)
*G02B 5/08* (2006.01)
*G02F 1/157* (2006.01)
(Continued)

(52) U.S. Cl.
CPC .................. *B60R 1/04* (2013.01); *B60R 1/12* (2013.01); *B60R 2001/1253* (2013.01); *G02B 27/01* (2013.01); *G02F 1/157* (2013.01); *G07B 15/00* (2013.01)

(58) Field of Classification Search
CPC .. B60R 1/04; B60R 1/12; B60R 1/088; B60R 2001/1253; G02B 27/01; G02F 1/157; G07B 15/00
See application file for complete search history.

(56) References Cited

U.S. PATENT DOCUMENTS 7,292,208 B1 * 11/2007 Park ........................ B60R 1/12
345/2.1
9,487,144 B2 * 11/2016 Blank ...................... B60R 1/12
(Continued)

FOREIGN PATENT DOCUMENTS

KR  10-2011-0078721 A  7/2011

*Primary Examiner* — Tan Le
(74) *Attorney, Agent, or Firm* — Morgan, Lewis & Bockius LLP

(57) ABSTRACT

A rearview mirror having a tilting structure configured for securing a rear view through a display device by tilting an upper housing may include: a lower housing configured to be fixed to a windshield glass; an upper housing configured to be positioned at an opening portion of the lower housing; a mirror portion configured to be positioned at a rear surface of the upper housing; and a display device configured to be positioned at a rear surface of the mirror portion, in which the mirror portion and the display device are fixed to the upper housing, and the upper housing is tilted based on a first end portion to provide a rear view through the display device.

13 Claims, 6 Drawing Sheets

(51) Int. Cl.
*H04N 7/18* (2006.01)
*G02B 27/01* (2006.01)

(56) References Cited

U.S. PATENT DOCUMENTS

| | | | | |
|---|---|---|---|---|
| 2006/0255960 | A1* | 11/2006 | Uken | B60K 35/00 340/815.4 |
| 2007/0171037 | A1* | 7/2007 | Schofield | B60C 23/00 340/438 |
| 2011/0096427 | A1* | 4/2011 | Uken | B60R 1/04 359/872 |
| 2013/0170013 | A1* | 7/2013 | Tonar | B60R 1/088 359/296 |
| 2016/0250970 | A1* | 9/2016 | Kuester | B60R 1/12 348/148 |
| 2018/0354420 | A1* | 12/2018 | Hallack | B60R 1/04 |

* cited by examiner

REARVIEW MIRROR HAVING TILTING STRUCTURE

CROSS-REFERENCE(S) TO RELATED APPLICATIONS

The present application claims priority to Korean Patent Application No. 10-2017-0080798, filed on Jun. 26, 2017, the entire contents of which is incorporated herein for all purposes by this reference.

BACKGROUND OF THE INVENTION

Field of the Invention

The present invention relates to a rearview mirror having a tilting structure. More particularly, the present invention relates to a rearview mirror having a tilting structure in which a lower housing is fixed to a windshield glass and an upper housing positioned on an opening portion of the lower housing and on which a mirror portion and a display device are positioned is configured to be tilted, to provide a rear view through the mirror portion in a state in which the upper housing is closed, and to provide a rear view through the display device positioned on an internal side of the upper housing.

Description of Related Art

A rearview device of a vehicle includes an internal mirror and an external mirror. The internal mirror is disposed at the center of an upper portion of an interior windshield glass or at the front center of a headlining, and the external mirror is disposed at front upper portions of opposite door panels, wherein rear view of the vehicle is secured by the internal mirror and rear view of opposite external side surfaces of the vehicle is secured by the external mirror.

Furthermore, development of an internal mirror including a display device is in an increasing trend, since there is a need to secure rear view in consideration of an amount of light introduced into the vehicle, an amount of light introduced from a rear vehicle, and driving at night, in securing rear view through the inside mirror.

FIG. 1 illustrates an internal mirror 10 including a display device according to the related art.

As illustrated in FIG. 1, in the internal mirror 10 in which a housing 11 includes an opening portion, a display device 13 and a mirror 12 are positioned at the same opening portion.

However, as described above, in a case in which the display mirror and a general mirror are positioned at the same opening portion, image overlay occurs, wherein securing rear view is difficult.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rearview mirror including a mirror portion and a display device, selectively providing rearview.

Various aspects of the present invention are directed to providing an upper housing structure that may be tilted to remove image overlay occurring in securing rear view using a display device.

Objects of the present invention are not limited to the above-described object and other objects can be appreciated by the following description described with reference to the exemplary embodiments of the present invention. Furthermore, the objects of the present invention may be implemented by device claimed in claims and a combination thereof.

A rearview mirror having a tilting structure may include configurations as follows.

Various aspects of the present invention are directed to providing a rearview mirror having a tilting structure, including: a lower housing configured to be fixed to a windshield glass; an upper housing configured to be positioned at an opening portion of the lower housing; a mirror portion configured to be positioned at a rear surface of the upper housing; and a display device configured to be positioned at a rear surface of the mirror portion, in which the mirror portion and the display device are fixed to the upper housing, and the upper housing is tilted based on a hinge portion positioned at one end portion at which the upper housing and the lower housing contact each other to provide a rear view through the display device.

In an exemplary embodiment of the present invention, the lower housing may include a button portion configured to be positioned at one end portion of the lower housing, the upper housing may include an insertion portion configured to be positioned at the upper housing to correspond to the button portion so that the button portion is inserted, and the button portion may be released from the insertion portion so that the upper housing is tilted.

In another exemplary embodiment of the present invention, the rearview mirror may further include: a switch portion configured to be positioned on a surface below the inserted button portion to control turning On or off of the display device, in which when the button portion is inserted to tilt the upper housing, the switch portion may be switched to turn on the display device.

In yet another exemplary embodiment of the present invention, the button portion and the insertion portion may be a snap-fit coupling structure.

In yet another exemplary embodiment of the present invention, the upper housing may further include a locking groove so that the button portion is fixed to an internal surface of the upper housing when the upper housing is tilted so that one end portion thereof is drawn out.

In still yet another exemplary embodiment of the present invention, the rearview mirror may further include: an elastic member configured to be positioned at the hinge portion, in which the elastic member may provide a rotational force so that the upper housing maintains a closed state.

In a further exemplary embodiment of the present invention, the rearview mirror may further include: a mounting guide portion configured to fix the lower housing to the windshield glass.

In another further exemplary embodiment of the present invention, the windshield glass and the lower housing may be coupled with the mounting guide portion through a ball bearing, respectively.

In yet another further exemplary embodiment, the rearview mirror may further include: a controller configured to control image output of the display device.

In yet another further exemplary embodiment of the present invention, the controller may output an image photographed by a camera positioned at an external side of a vehicle in the display device, and correct the image output in the display device to provide the same view as a rear view provided through the mirror portion.

In still yet another further exemplary embodiment of the present invention, the mirror portion may be configured by an electronic chromic mirror (ECM).

In a still further exemplary embodiment of the present invention, when the upper housing is tilted, a reflection rate control function of the ECM may be released.

In a yet still further exemplary embodiment of the present invention, the hinge portion may include a rotation shaft positioned at the lower housing, and one end portion of the upper housing may be fixed to the rotation shaft.

Other aspects and exemplary embodiments of the invention are discussed infra.

It is understood that the term "vehicle" or "vehicular" or other similar term as used herein is inclusive of motor vehicles in general including passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
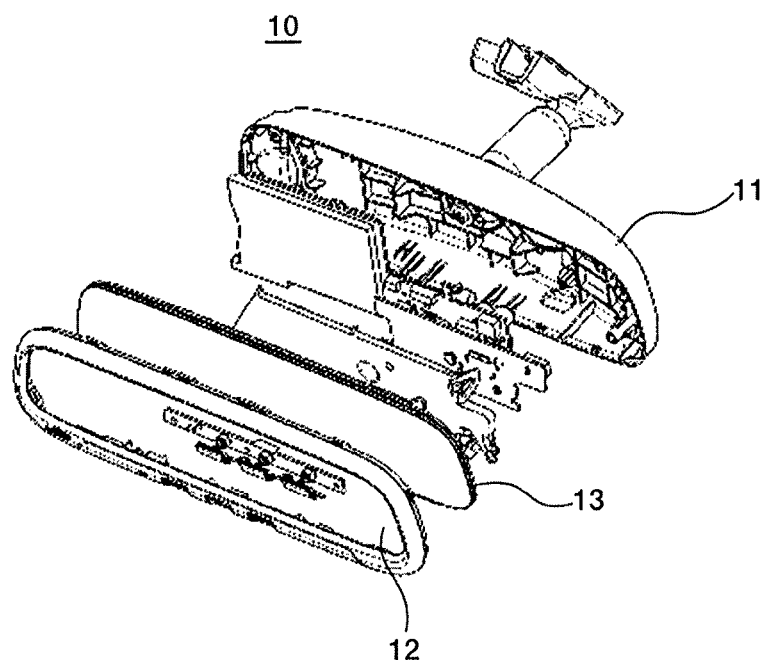
FIG. 1 illustrates an internal mirror providing fixed rear view through a display device and a mirror portion according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and the shapes will be determined in part by the particularly intended application and use environment.

In the figures, reference numbers refer to the same or equivalent parts of the present invention throughout the several figures of the drawing.

DETAILED DESCRIPTION

Reference will now be made to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Furthermore, a term "part", "unit", or the like, described in the specification device a unit of processing at least one function or operation and may be implemented by hardware or software or a combination of hardware and software.

Various aspects of the present invention are directed to providing a rearview mirror 100 having a tilting structure, the rearview mirror 100 configured for providing rear view through a mirror portion 130 in a closed state, and providing rearview through a display device 140 displaying rear view image photographed by a camera positioned at an external side of a vehicle when an upper housing 120 is tilted.

Figure 2:
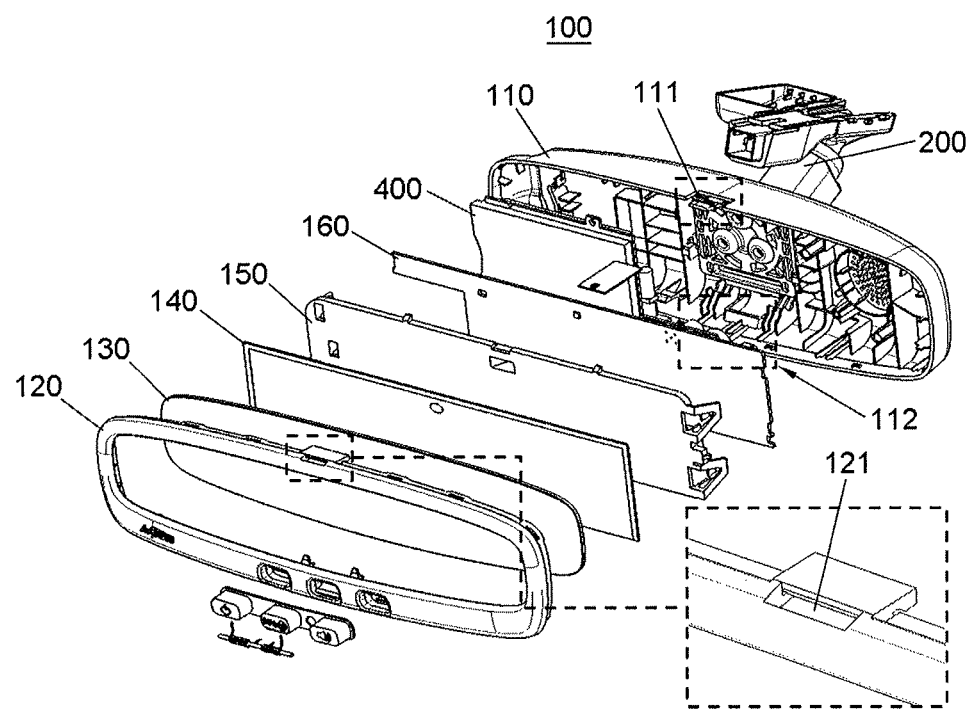
FIG. 2 is a diagram illustrating a configuration of a rearview mirror having a tilting structure according to an exemplary embodiment of the present invention.

FIG. 2 is a diagram illustrating a configuration of the rearview mirror 100 having a tilting structure which is positioned to be fixed to a windshield glass 300 according to an exemplary embodiment of the present invention.

The rearview mirror 100 includes a mounting guide portion 200 configured to fix a lower housing 110 including an opening portion at an internal side of the windshield glass 300 and the upper housing 120 configured to cover the opening portion of the lower housing 110.

The upper housing 120 is configured to surround a circumference of the opening portion of the lower housing 110, thus the mirror portion 130 and the display device 140 are sequentially positioned on a rear surface of the upper housing 120.

According to the exemplary embodiment of the present invention, the rearview mirror 100 includes a fixing plate configured to integrally fix the upper housing 120, the mirror portion 130, and the display device 140. The other end portion of the upper housing 120 may be tilted to the front of the rearview mirror 100 based on a lower end portion of the upper housing 120.

According to the exemplary embodiment of the present invention, the mirror portion 130 is configured by an electronic chromic mirror (ECM) and is configure for controlling a reflection rate of light introduced into the rearview mirror 100.

Furthermore, the upper housing 120 includes an insertion portion 121 positioned at one end portion of the upper housing 120, and the lower housing 110 includes a button portion 111 positioned at the lower housing 110 to correspond to the insertion portion 121. The button portion 111 and the insertion portion 121 are fastened in a state in which the upper housing 120 of the rearview mirror 100 is closed, fixing the upper housing 120 and the lower housing 110 to each other.

The button portion 111 and the insertion portion 121 may perform snap-fit coupling, thus the lower housing 110 including the button portion 111 and the upper housing 120 including the insertion portion 121 may include a plastic material having an elasticity, and may be formed by injection molding.

Furthermore, the rearview mirror 100 includes a controller 160 configured to control the display device 140 at an internal side of the lower housing 110, and the controller 160 is configured to control an operation of the display device 140 according to a ON/OFF state of a switch portion 170.

Furthermore, the controller 160 is configured to control a reflection rate of the ECM. The controller is configured to measure an amount of introduced light by an illuminance detector positioned in the upper housing 120 or the lower housing 110 and control a reflection rate of the ECM according to the measured amount of light.

Furthermore, in the exemplary embodiment of the present invention, an electronic toll collection system (ETCS) positioned on a side surface of the lower housing may be disposed.

Figure 3:
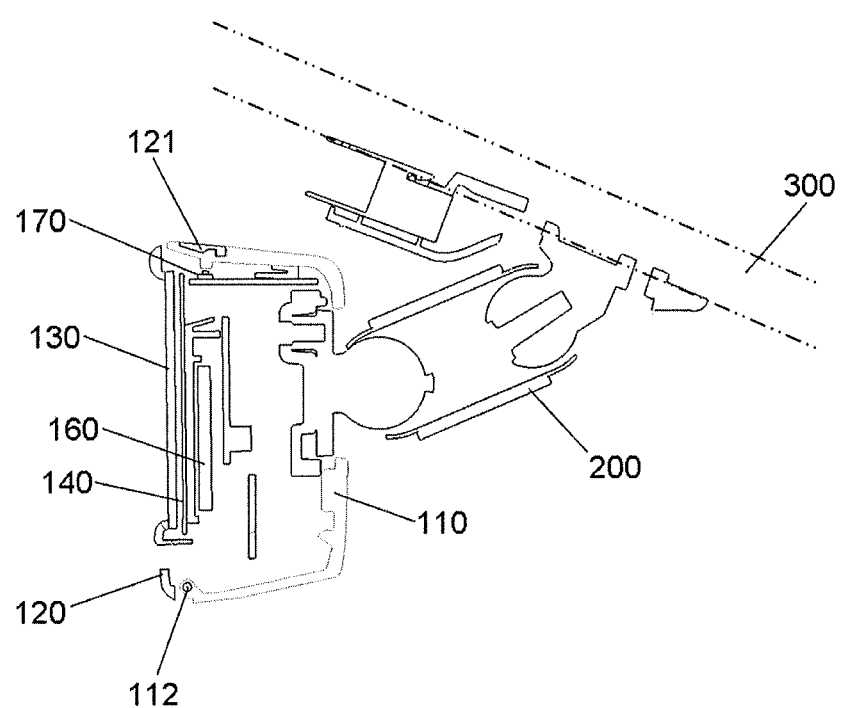
FIG. 3 is a side cross-sectional diagram of the rearview mirror having a tilting structure according to the exemplary embodiment of the present invention.

FIG. 3 is a side cross-sectional diagram of the rearview mirror 100 having a tilting structure according to the exemplary embodiment of the present invention.

As illustrated in FIG. 3, the upper housing 120 of the rearview mirror 100 maintains a closed state, thus the switch portion 170 maintains an OFF state. Therefore, the display device 140 maintains an OFF state, the rear view is provided to the driver through the mirror portion 130.

According to an exemplary embodiment of the present invention, the rearview mirror 100 may include a mounting guide portion 200 configured to fix the windshield glass 300 and the lower housing 110, and a ball bearing fastening structure may be provided at each end portion at which the windshield glass 300 and the lower housing 110 meet each other and the lower housing 110 and the mounting guide portion 200 meet each other.

A hinge portion 112 is provided at a position where a lower end portion of the upper housing 120 and a lower end portion of the lower housing 110 contacts each other, and the button portion 111 is configured to be positioned at an upper end portion of the lower housing 110. Furthermore, the insertion portion 121 configured to correspond to the button portion 111 is positioned at an upper end portion of the upper housing 120, thus the button portion 111 and the insertion portion 121 are fastened in a state in which the upper housing 120 of the rearview mirror 100 is closed. The button portion 111 and the insertion portion 121 may be configured to perform snap-fit coupling to maintain a closed state in which the upper housing 120 and the housing 110 are fastened.

The button portion 111 may be configured as an insertion type button, and may include the switch portion 170 positioned at an internal side of the lower housing 110 below the button portion 111. Furthermore, when the button portion 111 is inserted to an internal side of the housing, the switch portion 170 may be configured so that the display device 140 is switched to an ON state.

Figure 4:
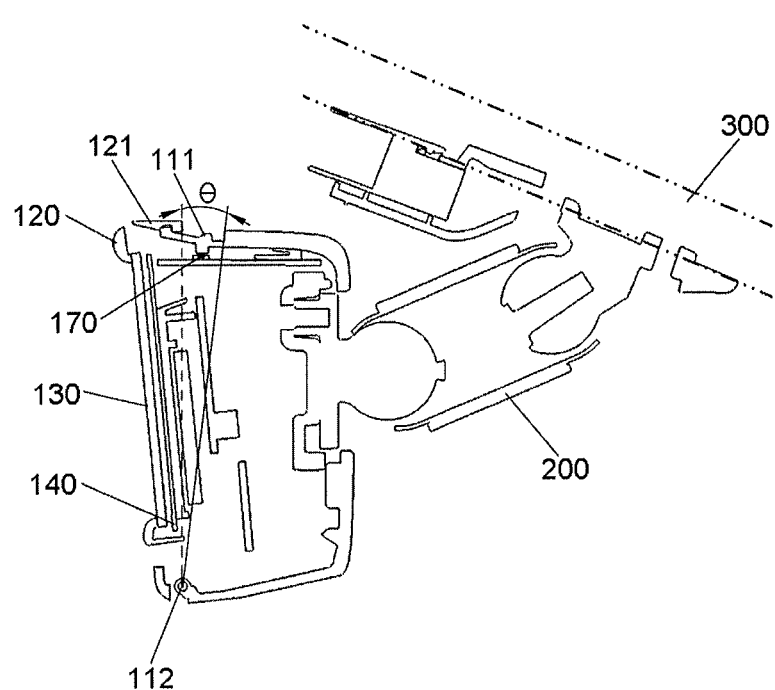
FIG. 4 is a side cross-sectional diagram of the rearview mirror having a tilting structure according to the exemplary embodiment of the present invention in a state in which an upper housing is tilted.

FIG. 4 is a side cross-sectional diagram of the rearview mirror 100 configured so that the upper housing 120 is tilted upwards to a predetermined angle based on the lower end portion of the upper housing 120.

As illustrated in FIG. 4, when a predetermined pressure is applied to the button portion 111 so that the button portion 111 is released from the insertion portion 121, the user provides the predetermined force to an upper end portion of the upper housing toward the rear of the vehicle so that the upper housing 120 is tilted.

That is, the upper end portion of the upper housing 120 is moved away from the windshield glass 300 based on the hinge portion 112 positioned at the lower end portion of the upper housing 120 and the lower housing 110, and a viewing surface of the mirror portion 130 which provides the rear view in the closed state moves downward by the tilting angle.

Furthermore, the inserted button portion 111 is configured to switch a state of the switch portion 170 positioned at the internal side of the lower housing 110 to the ON state, and the display device 140 conducted by the switch portion 170 is configured to display an image photographed by the camera positioned at the external side of the vehicle.

The camera positioned at the external side of the vehicle in an exemplary embodiment of the present invention may include a plurality of cameras for providing a complete surrounding view of the vehicle, and the controller 160 may be configured to edit and compensate images photographed by the plurality of cameras to provide an image identical to the rear view provided through the mirror portion 130.

That is, the controller 160 according to an exemplary embodiment of the present invention may be configured to edit an image photographed by at least one camera to have the same view range, focal point, and size as the rear view provided by the mirror portion 130, and display the edited and compensated image in the display device 140.

Furthermore, when the rear view is provided by the display device 140, the controller 160 is configured to compensate an inclination of an image photographed by a camera configured to photograph an external side of the vehicle. That is, the display device 140 is configured to be inclined downward of the vehicle by a predetermined angle in a state in which the upper housing 120 is tilted, and performs compensation so that the rear view provided by an image displayed in the display device 140 has the same size, focal point, and inclination as those of the rear view provided by the mirror portion 130 by performing a comparison with the rear view provided by the mirror portion 130 in a state in which the upper housing 120 is closed.

Therefore, the controller 160 in an exemplary embodiment of the present invention may be configured to perform a control of compensating the inclination by the predetermined angle based on the image photographed by the camera positioned at the external of the vehicle, and perform a control to display an image of the same area.

Furthermore, in an exemplary embodiment of the present invention in which the mirror portion 130 is configured by an ECM, when the upper housing 120 is tilted, a function of controlling a reflection rate of the mirror portion 130 is released, preventing image overlay with the image displayed by the display device 140.

Accordingly, according to an exemplary embodiment of the present invention, in the state in which the upper housing 120 is closed, the rear view of the vehicle is provided through the mirror portion 130, and the display device 140 is configured to maintain the OFF state, and in the state in which the upper housing 120 is tilted, the button portion 111 is inserted to switch the state of the switch portion 170 to the ON state, providing the rear view through the display device 140.

In the case in which the upper housing 120 is tilted, compensation is performed so that the image output in the display device 140 tilted while being integrally fixed with the upper housing 120 is identical to the rear view provided through the mirror portion 130, and a reflection rate control function of the ECM is released.

Therefore, according to an exemplary embodiment of the present invention, in the case in which the upper housing 120 is tilted to provide the rear view through the display device 140, the upper housing 120 is tilted to have the predetermined angle to prevent image overlay by the mirror portion 130 and the display device 140 from occurring on the rearview mirror 100.

Figure 5:
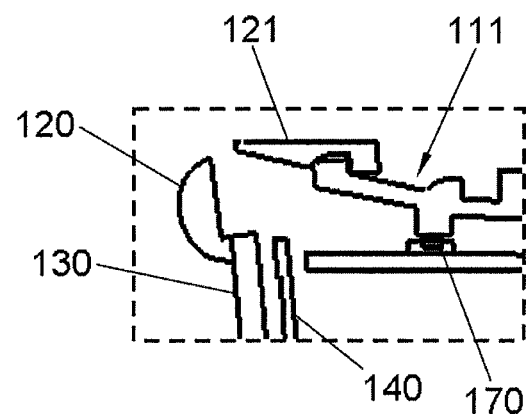
FIG. 5 illustrates a switch portion of the rearview mirror having a tilting structure according to the exemplary embodiment of the present invention.

FIG. 5 illustrates a coupling structure of the button portion 111 and the insertion portion 121 in the state in which the upper housing 120 is tilted according to an exemplary embodiment of the present invention.

The rearview mirror 100 according to an exemplary embodiment of the present invention may include the insertion portion 121 positioned at a tilted end portion of the upper housing 120, and the button portion 111 positioned at the lower housing 110 to correspond to the insertion portion 121. Furthermore, the insertion portion 121 and the button portion 111 may be configured to be snap-fit-coupled to each other.

Furthermore, the upper end portion of the upper housing 120 is configured to rotate toward the rear of the vehicle based on the lower end portion of the upper housing 120, accordingly, the button portion 111 is press-fitted to an internal side of the insertion portion 121, and the upper housing 120 rotates toward the external of the rearview mirror 100 by the press-fitted button portion 111.

The button portion 111 is configured to contact the switch portion 170 positioned at the internal side of the lower housing 110, switching the state of the switch device 170 to the ON state to drive the display device 140.

Figure 6:
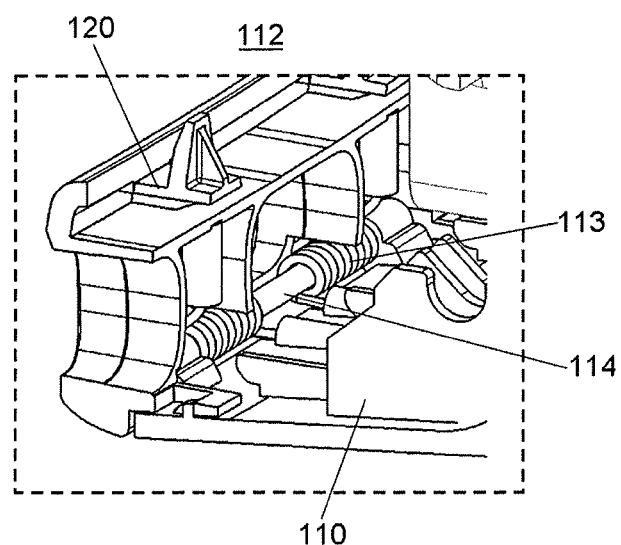
FIG. 6 illustrates a hinge portion at which the rearview mirror having a tilting structure according to the exemplary embodiment of the present invention.

FIG. 6 illustrates the hinge portion 112 connected to the lower housing 110 when the upper housing 120 is tilted according to an exemplary embodiment of the present invention.

As illustrated in FIG. 6, the upper housing 120 is configured to include the hinge portion 112 having one end portion hinged to the lower housing 110. According to an exemplary embodiment of the present invention, the hinge portion 112 is configured to include a rotation shaft and the rearview mirror 100 includes an elastic member 113 providing a predetermined elastic force based on the rotation shaft.

The elastic member 113 is configured to provide a predetermined tensile force in a rotational direction of the upper housing 120, providing force to restore the upper housing 120 to the closed state. On the other hand, according to another exemplary embodiment of the present invention, the elastic member 113 may provide the predetermined force so that the upper housing 120 is changed to the tilted state.

Accordingly, the button portion 111 configured coupling the upper housing 120 and the lower housing 1110 is pressed, to be inserted, to the internal side of the insertion portion 121, and the upper end portion of the upper housing 120 rotates based on the hinge portion 112 by the pressed button portion 111, wherein the mirror portion 130 and the display device 140 that are integrally formed with the upper housing 120 are tilted.

Furthermore, the pressed button portion 111 switches the state of the switch portion 170 to the ON state, wherein the rear view is provide through the display device 140.

Figure 7:
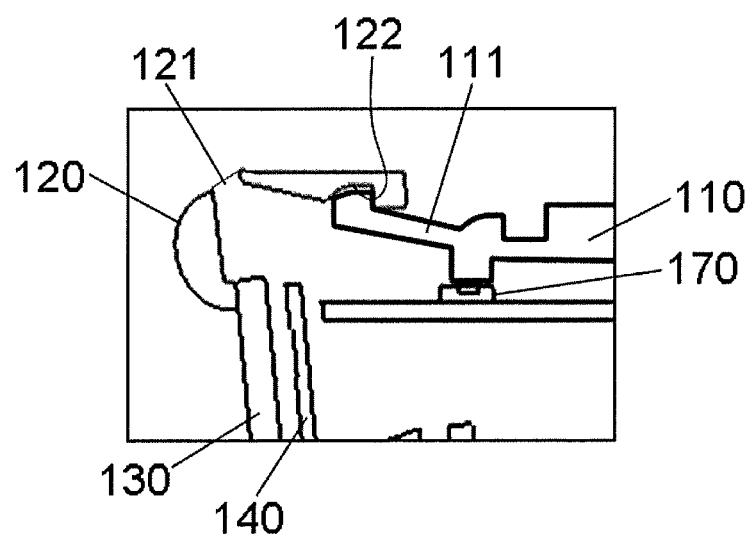
FIG. 7 illustrates a locking structure when the upper housing of the rearview mirror having a tilting structure according to the exemplary embodiment of the present invention is tilted.

FIG. 7 illustrates coupling between a locking groove 122 at an internal side surface of the tilted upper housing 120 and the button portion 111 according to an exemplary embodiment of the present invention.

As illustrated in FIG. 7, when the button portion 111 is pressed to be inserted to the internal side of the insertion portion 121, the upper housing 120 is tilted away from the rearview mirror 100 based on the hinge portion 112. A locking groove 122 configured to correspond to the button portion 111 is formed at an internal side surface of the upper portion of the upper housing 120 and rotated by the predetermined angle.

Therefore, as the button portion 111 having the elastic force is pressed to be inserted and the restoring force is applied, the button portion 111 and the locking groove 122, configured to correspond to the button portion 111 at the internal side surface of the upper housing 120, may be fastened to each other. Accordingly, the locking groove 122 and the button portion 111 are configured to be positioned so that the upper housing 120 is tilted by the predetermined tilting angle, preventing noise from occurring in the state in which the upper housing 120 is tilted.

Furthermore, when the locking groove 122 and the button portion 111 are fastened to each other as the upper housing 120 is tilted, vibration of the upper housing 120 may be prevented, and fixing force to maintain the predetermined tilting angle is provided.

Furthermore, according to an exemplary embodiment of the present invention, when the upper housing 120 includes an elastic member 113 providing the force to restore the upper housing 120 toward the lower housing 110 to be in the closed state, a coupling structure of the locking groove 122 and the button portion 111 is provided so that the upper housing 120 maintains a predetermined angle.

According to an exemplary embodiment of the present invention, the following effects may be obtained by the configuration, coupling, and relationship in use described above.

The present invention selectively provides rearview in consideration of a driving environment of a user, increasing user convenience.

Furthermore, when providing the rear view through the display device, it is possible to provide a more clear rear view by removing image overlay.

Furthermore, the OFF/OFF state of the display device is selectively performed, reducing power consumption in a vehicle.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rearview mirror apparatus having a tilting structure, comprising:
   a lower housing fixed to a windshield glass;

an upper housing disposed at an opening portion of the lower housing;

a mirror portion disposed at a rear surface of the upper housing; and a display device disposed at a rear surface of the mirror portion, wherein the mirror portion and the display device are fixed to the upper housing, and the upper housing is formed to be tilted at a predetermined angle based on a hinge portion disposed at a first end portion at which the upper housing and the lower housing contact each other wherein the tilted upper housing is configured to contact with a switch portion to control an On or Off state of the display device.

2. The rearview mirror apparatus of claim 1, wherein the lower housing includes a button portion disposed at a first end portion of the lower housing, the upper housing includes an insertion portion disposed at the upper housing to correspond to the button portion so that the button portion is inserted, and the button portion is released from the insertion portion so that the upper housing is tilted.

3. The rearview mirror apparatus of claim 2, further including:

the switch portion disposed below the inserted button portion to control an On or off state of the display device, wherein, when the button portion is inserted to tilt the upper housing, the switch portion is switched to turn on the display device.

4. The rearview mirror apparatus of claim 2, wherein the button portion and the insertion portion have a snap-fit coupling structure.

5. The rearview mirror apparatus of claim 2, wherein the upper housing further includes a locking groove so that the button portion is fixed to an internal surface of the upper housing when the upper housing is tilted so that a first end portion thereof is drawn out.

6. The rearview mirror apparatus of claim 1, further including:

an elastic member disposed at the hinge portion, wherein the elastic member provides a rotational force so that the upper housing maintains a closed state.

7. The rearview mirror apparatus of claim 1, further including:

a mounting guide portion fixing the lower housing to the windshield glass.

8. The rearview mirror apparatus of claim 7, wherein the windshield glass and the lower housing are coupled with the mounting guide portion through a ball bearing, respectively.

9. The rearview mirror apparatus of claim 1, further including:

a controller configured to control an image output of the display device.

10. The rearview mirror apparatus of claim, 9, wherein the controller is configured to output an image photographed by a camera disposed at an external side of a vehicle in the display device, and to correct the image output in the display device to provide a same view as a rear view provided through the mirror portion.

11. The rearview mirror apparatus of claim 1, wherein the mirror portion is configured by an electronic chromic mirror (ECM).

12. The rearview mirror apparatus of claim 11, wherein, when the upper housing is tilted, a reflection rate control function of the ECM is released.

13. The rearview mirror apparatus of claim 1, wherein the hinge portion includes a rotation shaft disposed at the lower housing, and the first end portion of the upper housing is fixed to the rotation shaft.

* * * * *